United States Patent [19]

Müllner et al.

[11] 4,197,084
[45] Apr. 8, 1980

[54] METHOD OF TREATING LUMPY AND GRAINED MATERIALS WITH GASEOUS MEDIA

[75] Inventors: Paul Müllner, Traun; Ernst Wildling, Linz, both of Austria

[73] Assignee: Voest-Alpine Aktiengesellschaft, Linz, Austria

[21] Appl. No.: 923,093

[22] Filed: Jul. 10, 1978

[30] Foreign Application Priority Data

Jul. 18, 1977 [AT] Austria .................................. 5159/77

[51] Int. Cl.² ............................................. F27B 9/12
[52] U.S. Cl. ...................................... 432/18; 34/216; 432/128
[58] Field of Search .................... 432/13, 18, 19, 128; 34/10, 216

[56] References Cited

U.S. PATENT DOCUMENTS

| | | | |
|---|---|---|---|
| 2,899,189 | 8/1959 | Matis et al. ......................... | 34/216 X |
| 3,076,248 | 2/1963 | Darrow et al. ..................... | 432/13 X |
| 3,214,844 | 11/1965 | Dates et al. ............................ | 34/216 |
| 3,293,768 | 12/1966 | Blank et al. ............................. | 34/10 |
| 4,058,905 | 11/1977 | Knight .................................. | 432/18 |

*Primary Examiner*—John J. Camby
*Attorney, Agent, or Firm*—Brumbaugh, Graves, Donohue & Raymond

[57] ABSTRACT

In a method of treating lumpy and granular materials with gaseous media, the materials to be treated are introduced into open containers having at least two adjacent chambers communicating or connected with each other in their bottom regions. The materials to be treated lie on and contact the bottom and walls of the chamber as a packed bed where the at least two chambers communicate. A plurality of the open containers are arranged one behind the other so as to form a closed circuit or chain and are closeable by stationary lids or hoods arranged in the conveying direction. Each hood has a supply conduit for one container chamber and a drain conduit for the other container chamber. The container chain is moved in phases below the lids or hoods, the lids or hoods closing the containers during each standing phase while the treatment gas is transmitted through the container chambers.

7 Claims, 3 Drawing Figures

METHOD OF TREATING LUMPY AND GRAINED MATERIALS WITH GASEOUS MEDIA

BACKGROUND OF THE INVENTION

The invention relates to a method of treating lumpy or granular materials with gaseous media.

Particulate materials, such as lime, magnesite and dolomite, are treated for various purposes in different ways such as heated, cooled, dried, smouldered, roasted, sintered, burnt or reduced. With these methods of treatment, a gaseous medium is guided through the granular material at a certain temperature and possibly under elevated pressure. The methods of treatment listed as examples differ from one another in temperature, pressure, demand or occurrence of heat, and duration of treatment.

For the treatment of granular materials with a gaseous medium, numerous methods have been known which use various arrangements. Thus, for instance, for treatment at high temperatures (up to approximately 1,500° C.), such as in roasting, sintering, burning or reducing, shaft furnaces or retortes, revolving cylindrical furnaces, burning plants or a combination of these devices are used. All the methods of treatment which can be carried out with these arrangements, however, have the disadvantage that they are suitable for certain materials only.

A shaft furnace or a retorte, for instance, is not suited for sintering, since the sintered material cannot be carried out. Also a material which is not sufficiently gas-permeable because of its packing density cannot be treated by using these arrangements. Furthermore, it is difficult to subject the material to be treated to an intermediate treatment, and it is also difficult to control the treatment process.

When using a revolving cyclindrical furnace, the methods of treatment can be varied more easily, yet the costs of investing in such a furnace are very high. A further disadvantage consists in that it is uneconomical as regards its thermal efficiency. Process changes in wide ranges can be carried out with this furnace, but only over a long period of time.

Furthermore, it has been known to use travelling grates for treating granular materials. Such travelling grates are formed by grate cars joined together to form a continuous chain that continuously travels through a furnace. When the treatment temperatures are high, there is the danger that the grates will become overly deformed or even destroyed, since the treatment gases are also pressed or sucked through the grate. When the treatment temperatures are very high and the periods of treatment are very long at the same time, such as is necessary when calcinating limestone, travelling grates are not suitable. But, methods using travelling grates are also not suitable for types of treatment carried out at low temperatures, for which high pressure differences are necessary (e.g. for the drying of coal), since it is not possible to maintain high pressure differences.

SUMMARY OF THE INVENTION

The invention aims at providing a method of treating lumpy and granular materials with gaseous media, which can be used for various treatments, such as pelletizing of ores or drying, smouldering, roasting, heating and cooling, whereby it is possible to take into consideration the differences that occur with these treatments with regard to temperature, pressure, heat demand and heat occurrence as well as the duration of treatment, and which treatments can be carried out by using one single arrangement.

This object is achieved according to the invention in that the material to be treated is introduced into containers comprising at least two adjacent chambers communicating or connected in their bottom regions, wherein the material to be treated lies on and contacts the bottom and the walls of the container, especially in the connecting region of the two chambers, in the form of a packed bed. A plurality of these containers are arranged one behind the other so as to form a closed circuit or chain. The container mouths are closeable by lids or hoods each comprising a supply conduit for one container chamber and a drain conduit for the other container chamber. The container chain is guided in phases below lids or hoods which are arranged stationarily in the conveying direction, whereby, during each standing phase, the lids or hoods close the container and the treatment gas is transmitted through the container chambers.

The present invention particularly has as its object to provide a method which can be used with great advantage for the calcination of limestone. The methods known so far for the calcination of limestone have usually been carried out in shaft lime kilns, the lumpy limestone being charged at the upper end of the shaft and sinking down through a burning zone heated by gas or oil burners. At the bottom opening of the shaft, cold air is supplied, which air is heated in the counterflow direction of the burnt lime that is descending in the shaft and leaving the burning zone, until the air has a temperature of about 1,000° C. when it reaches the burning zone. The carbon dioxide formed during the disintegration of the limestone, and the flue gas resulting from the burning of fuel, flow up the shaft in the counterflow direction to the limestone charged at the upper end of the shaft, thus heating the limestone to be burnt by its waste heat.

Due to the high temperatures of 900° to 1,000° C., which have to be observed in the burning zone, the heat of the flue gas cannot be used in the preheating zone, since the flue gas still has a temperature of more than 300° C. at the upper end of the shaft. The amount of heat corresponding to this temperature either is lost without being used or can only be used in complex recuperation systems. A particular object of the invention is to prevent such a high flue gas temperature during the calcination of limestone and to recover the heat of the flue gas in such a way that a saving of fuel is possible in the burning zone.

This object is achieved according to the invention in that the container chain filled with granular limestone is led in several phases through a stationary preheating zone, a burning zone and a cooling zone. Cool air is introduced, at the end of the cooling zone, into the container chambers and is directed counter to the conveying direction of the container chain i.e. the counterflow direction. The temperature necessary for the calcination of limestone is produced in the heating zone by the burning of fuel, in particular oil or gas, and the process gases are introduced into the container chambers, preferably in the counterflow direction which is counter to the conveying direction of the container chain. In the preheating zone, hot flue gas is led in the counterflow direction through the remaining pairs of container chambers after leaving out at least one pair of container chambers, whereas cold air is transmitted through the skipped pairs of container chambers in the flow direction, i.e. in the conveying direction of the container chain. As a result one pair of container chambers after another is alternatively heated by the flue gas and then cooled off by the cooling air, whereupon the cold air heated in the preheating zone is introduced into the burning zone in order to save fuel.

BRIEF DESCRIPTION OF THE DRAWINGS

The invention will now be explained in more detail by way of one embodiment for the calcination of limestone, and with reference to the accompanying drawings, wherein.

DESCRIPTION OF AN ILLUSTRATIVE EMBODIMENT

Figure 1:
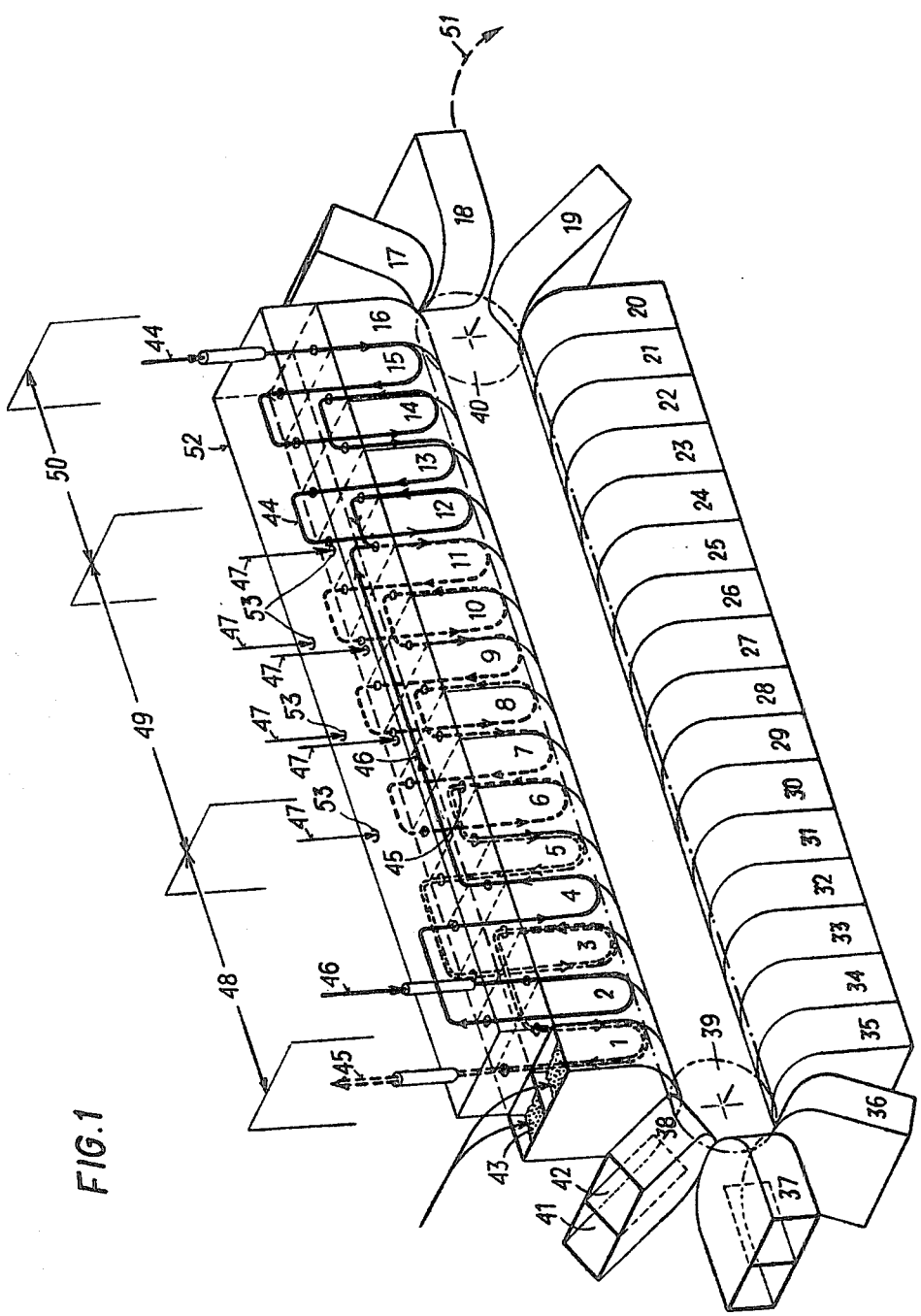
FIG. 1 represents in schematic fashion, apparatus for practicing the method according to the invention, which apparatus includes at a reaction container chain shown in oblique view.

The arrangement for carrying out the method comprises, as shown in FIG. 1, a plurality of reaction containers 1 to 38, which are connected, for instance articulately, with one another to form a continuous rotating chain. In the embodiment illustrated, 38 containers are provided, which are incrementally moved in phases or steps via two deflection pulleys 39, 40 in the clockwise direction, i.e. after each standing phase the chain is moved by one container length.

Each individual container comprises two adjacent chambers 41, 42, which, in their bottom regions, communicate with each other, the materials to be treated lying on and contacting the bottom in the bottom region and the container walls in the connecting region of the two chambers in the form of a packed bed. Supply conduits in an upper part or in a lid 52 of one chamber and drain conduits in the upper part or in the lid 52 of the other chamber (both not illustrated) cause a forced guidance of the process gas through the packed bed of each reaction container. While the containers 2 to 16 have the process gases flowing through them in the manner described afterwards, the container 1 is filled with limestone 43. The containers 2 to 6 in their position illustrated in FIG. 1 are in a preheating zone 48 for the limestone. A burning zone 49 extends over the containers 7 to 12, wherein heating is effected by means of oil or gas burners 53, while the calcined lime is cooled off in the containers 13 to 16 in a cooling zone 50. The containers 17, 18 and 19 are tilted about the deflection pulley 40, and the calcined lime 51 is automatically emptied.

In order to use the waste heat of the cooling zone 50, a certain amount of cold air 44, which in the drawing is shown by thick, full lines, is led through the container 16, thereby cooling the calcined lime 51 therein and heating itself up. This cold air, which has been slightly heated, then flows through the container 15 cooling the lime there by a certain percentage, and being heated further. This process is repeated when the air flows through the containers 14 and 13, after which the air is led to burners 53 of the heating zone 49.

During the calcination of limestone it is possible with this arrangement to cool the limestone off from 1,000° C. to about 80° C. and to heat the originally cold air to about 900° C.

In order to heat the limestone, hot flue gas 45 emerging from container 7, being composed substantially of smoke gases and expelled $CO_2$, and being represented in the drawing by a double broken line, is led through container 6, where it heats the limestone 43 therein. Afterwards, the flue gas which is still hot is led through container 4 after skipping container 5, and then, after skipping container 3, is led through container 2. Through container 3 cold air 46 (illustrated in full lines) is transmitted, which then, after skipping container 4, is conducted through container 5. Further on air 46 is added to the air 44 that has been heated up to 900° C. and is supplied to container 12, whereupon this united flow of air is led to the lid of zone 49. The burners 53 installed in the lid each use up a partial amount of the preheated air 44, 46 for the burning of the fuel.

Once the temperature of the flue gas 45 leaving the container 2 has reached approximately 120° C., the whole container chain is moved by one step. Container 38 proceeds to the filling position, container 1 takes the place of container 2 and the limestone therein is heated by the flue gas. Container 2, which now has replaced container 3, has cold air 46 flowing through it, i.e. the heat originally stored from the flue gases in the container 2 is given off to the cold air. The cold air 46 heated in this way flows through container 4, which, after advancement by one phase, has taken the place of container 5 of FIG. 1, removing from this container part of the heat introduced by means of the flue gases 45 before the advancement of the chain by one phase or step. Heat is thus alternately supplied to and withdrawn from the containers of the preheating zone 48. By this method, it is possible to totally exploit the heat of the flue gases 45, so that the flue gases leave the arrangement having a final temperature of only 120° C.

The amount of heat withdrawn from the flue gases 45, according to the invention, is conducted to the limestone 43, on the one hand, and to the cooling air 46 led through the preheating zone in the direction of travel of the chain and then to the chamber 12 in the burning zone, on the other hand, thus making possible a saving of the fuel.

Figure 2:
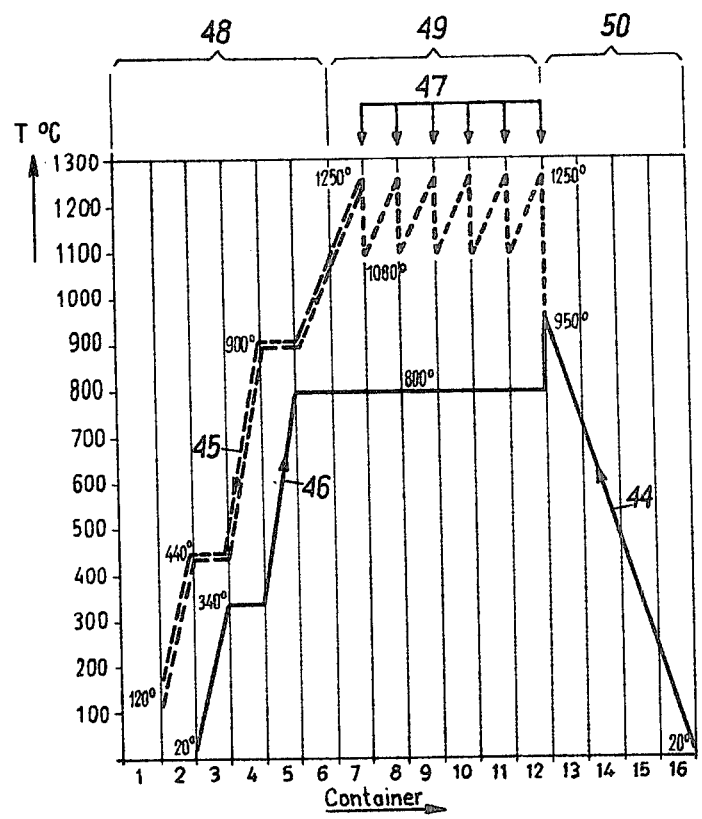
FIG. 2 shows the temperature course of the flue gas and the cooling air in the apparatus of FIG. 1.

In FIG. 2 the temperature course of the gas mixture 45 present in the burning zone 49 (smoke gases and expelled $CO_2$ as well as preheated cooling air) and that of the cooled air 44, 46 introduced over the container chain filled with material, is illustrated for the case where one burner is provided for each container in the burning zone 49.

Figure 3:
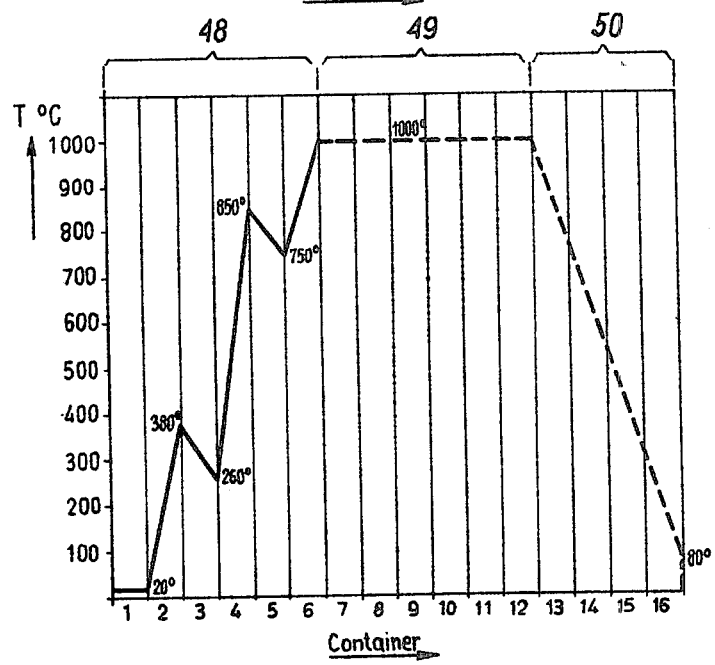
FIG. 3 illustrates the temperature course of the limestone, and the lime in the apparatus of FIG. 1.

FIG. 3 illustrates the course of the temperatures of the limestone (full line) and of the lime (broken line). The jagged course in the preheating zone 48 is caused by the alternation in phases, of cold air 46 and hot gas mixture 45 in the containers of the preheating zone.

The following Tables 1 to 3 illustrate the heat balance for the calcination of 1 kg of pure $CaCO_3$ according to the method of the invention, losses not being taken into consideration.

Table 1 shows the heat consumption and the heat supply for each treatment zone 48, 49 and 50. In Table 2 the calculated heat surplus or heat deficit, respectively, of each treatment zone is illustrated, whereas Table 3 shows that the ideal process can be carried out, if the excess heat of the preheating zone 48 and the cooling zone 50 is supplied to the burning zone.

TABLE 1

| Zone | Heat Consumption | | In | kJ |
|---|---|---|---|---|
| Preheating zone 48 | Heating limestone | 1,000° C. | | −1,831 |
| | Heat of flue gas CO₂ | 110° C. | | −56 |
| | Heat of flue gas smoke-gas | 110° C. | | 140 |
| Burning zone 49 | Disintegration limestone | 1,000° C. | | −3,180 |
| | Heating smokegas | 1,100° C. | | −1,940 |
| Cooling zone 50 | Waste-heat loss lime | 80° C. | | −53 |
| | | | | −7,200 |

| Zone | Heat Supply | | In | kJ |
|---|---|---|---|---|
| Preheating zone 48 | Heat contents CO₂ | 1,000° C. | | +860 |
| | Heat contents smokegas | 1,100° C. | | +1,940 |
| Burning zone 49 | Heat supply by heavy oil | | | +3,540 |
| Cooling zone 50 | Heat contents lime | | | +860 |
| | | | | +7,200 |

TABLE 2

| | kJ |
|---|---|
| 1. Preheating zone 48 | |
| Heat consumption | −2,027 |
| Heat supply | +2,800 |
| Heat surplus | +773 |
| 2. Burning zone 49 | |
| Heat consumption | −5,120 |
| Heat supply | +3,540 |
| Heat deficit | −1,580 |
| 3. Cooling zone 50 | |
| Heat consumption | −53 |
| Heat supply | +860 |
| Heat surplus | +807 |

TABLE 3

| | kJ |
|---|---|
| Heat surplus preheating zone 48 | +773 |
| Heat surplus cooling zone 50 | +807 |
| Heat deficit burning zone 49 | −1,580 |
| | 0,000 |

The method of the invention has other advantages as well. Thus it is, for instance, possible to conduct the calcination in the burning zone 49 in steps, i.e. the necessary total amount of fuel can be added in partial amounts 47 distributed over the length of the burning zone 49 (FIGS. 1 and 2). The size of the partial amount depends on the calcination temperature desired and is smaller the lower the calcination temperature should be, i.e. the lower the calcination temperature desired, the more steps with correspondingly small partial amounts are required. In the embodiment illustrated, fuel is added to each container in the burning zone, according to the position of the containers of FIG. 1 this would be containers 7 to 12. When the preheated air enters the container 12, the first partial amount of fuel (in liquid or gaseous form) is added. The smokegas-air-mixture that forms and has a certain temperature, flows through container 12 and gives off heat to the limestone, thus disintegrating the same. Before the mixture enters the container 11, another partial amount of fuel is added. This procedure is repeated up to container 7 inclusive. The partial amounts of fuel can be of unequal sizes in the various steps, a desired temperature profile thus being adjustable and controllable. It is possible to keep the calcination temperature very low and constant over the length of the burning zone. A further advantage of the present invention lies in the fact that it is possible to keep pressure losses low by distributing the streams of process gas to several conduits.

What we claim is:

1. A method of treating lumpy and granular materials with gaseous media in open containers, each container having at least two adjacent chambers with walls and communicating with each other in their bottom regions, a plurality of said containers being arranged one behind the other so as to form a closed circuit container chain that is intermittently movable in steps so as to have standing and moving phases, said adjacent chambers being arranged beside each other in the direction transverse to the conveying direction, stationary closing means being provided for said open containers and being arranged in the conveying direction, said closing means including a supply conduit for one of said at least two adjacent chambers and a drain conduit for the other of said at least two adjacent chambers, said closing means closing said containers during each standing phase, comprising the steps of:
   introducing said materials to be treated into the containers in the form of a packed bed located in the bottom regions of the adjacent chambers and contacting said chamber walls where the chambers communicate,
   moving said closed-circuit container chain in steps below said stationary closing means, and
   transmitting at least one process gas through the adjacent chambers during the standing phase.

2. A method as set forth in claim 1, wherein said closing means are lids.

3. A method as set forth in claim 1, wherein said closing means are hoods.

4. A method as set forth in claim 1, wherein said lumpy and granular materials are limestone and said closed-circuit container chain is moved in phases through a stationary preheating zone, a stationary burning zone and a stationary cooling zone, and further including the steps of
   introducing cold air into the adjacent chambers at the end of the stationary cooling zone in a counterflow direction counter to the conveying direction of said closed-circuit container chain,
   burning fuel to produce the temperature necessary for calcination of said granular limestone in said stationary burning zone,
   transmitting hot flue gas resulting from the burning of fuel to the stationary preheating zone in the counterflow direction through the adjacent chambers of some of the containers in the preheating zone after skipping the adjacent chambers of at least one remaining container in that zone,
   transmitting cold air, simultaneously with the transmission of the flue gas, in the conveying direction of the container chain through the adjacent chambers of the at least one remaining container skipped by the flue gas, whereby the adjacent chambers of a container are alternately heated by said hot flue gas and subsequently cooled off by said cold air, and
   introducing said cold air heated in said stationary preheating zone into said stationary heating zone so as to save fuel.

5. A method as set forth in claim 4, wherein said fuel is oil.

6. A method as set forth in claim 4, wherein said fuel is gas.

7. A method as set forth in claim 4, wherein said process gases are introduced into the adjacent chambers in the counterflow direction to the conveying direction of said closed-circuit container chain.

* * * * *